(12) United States Patent
Zhai (10) Patent No.: US 10,013,102 B2
(45) Date of Patent: Jul. 3, 2018

(54) TOUCH PANEL USING MULTIPLE KINDS OF TOUCH ELECTRODES, METHOD FOR DRIVING THE TOUCH PANEL, AND TOUCH DISPLAY DEVICE THEREOF

(71) Applicants: SHANGHAI TIANMA MICRO-ELECTRONICS CO., LTD., Shanghai (CN); TIANMA MICRO-ELECTRONICS CO., LTD, Shenzhen (CN)

(72) Inventor: Yingteng Zhai, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 183 days.

(21) Appl. No.: 15/001,974

(22) Filed: Jan. 20, 2016

(65) Prior Publication Data
US 2016/0291782 A1 Oct. 6, 2016

(30) Foreign Application Priority Data

Apr. 1, 2015 (CN) .......................... 2015 1 0153141

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

2006/0274055 A1  12/2006  Reynolds et al.
2011/0084857 A1   4/2011  Marino et al.
(Continued)

FOREIGN PATENT DOCUMENTS

CN    1908881 A   2/2007
CN  102576272 A   7/2012
(Continued)

OTHER PUBLICATIONS

Chinese Application No. 201510153141.1, First Office Action dated Mar. 27, 2017.

*Primary Examiner* — Amr Awad
*Assistant Examiner* — Donna Lui
(74) *Attorney, Agent, or Firm* — Alston & Bird LLP (57) ABSTRACT

A touch panel, a method for driving the touch panel and a touch display device are provided. The touch panel includes a substrate, and multiple touch electrodes and touch electrode lines located on the substrate, the touch electrodes are respectively connected to the touch electrode lines. The touch electrodes include at least a first touch electrode and a second touch electrode, and the touch electrode lines include at least a first touch electrode line and a second touch electrode line. The first touch electrode line is disposed at a position where the first touch electrode line do not overlap with a projection region of other touch electrode driven simultaneously with the first touch electrode in the direction perpendicular to the touch panel.

15 Claims, 5 Drawing Sheets

(56) References Cited

U.S. PATENT DOCUMENTS

| | | | |
|---|---|---|---|
| 2014/0146009 A1* | 5/2014 | Huang | G06F 3/0416 |
| | | | 345/174 |
| 2014/0184944 A1 | 7/2014 | Ma et al. | |
| 2014/0362031 A1 | 12/2014 | Mo et al. | |
| 2015/0355743 A1* | 12/2015 | Hu | G06F 3/0412 |
| | | | 345/175 |
| 2016/0027356 A1* | 1/2016 | Cheng | H01L 27/12 |
| | | | 345/173 |
| 2016/0041666 A1* | 2/2016 | Lee | G02F 1/13338 |
| | | | 345/174 |
| 2016/0188107 A1* | 6/2016 | Shepelev | G06F 3/0418 |
| | | | 345/174 |
| 2016/0266677 A1 | 9/2016 | Liu et al. | |
| 2016/0364060 A1* | 12/2016 | Wang | G02F 1/1333 |
| 2016/0370944 A1* | 12/2016 | Zhao | G06F 3/041 |

FOREIGN PATENT DOCUMENTS

| | | |
|---|---|---|
| CN | 103268178 A | 8/2013 |
| CN | 103279245 A | 9/2013 |
| CN | 104020913 A | 9/2014 |

\* cited by examiner

TOUCH PANEL USING MULTIPLE KINDS OF TOUCH ELECTRODES, METHOD FOR DRIVING THE TOUCH PANEL, AND TOUCH DISPLAY DEVICE THEREOF

CROSS REFERENCE TO RELATED APPLICATIONS

The present application claims the priority of Chinese Patent Application No. 201510153141.1, titled "TOUCH PANEL AND METHOD FOR DRIVING THE SAME, AND TOUCH DISPLAY DEVICE", filed on Apr. 1, 2015 with the State Intellectual Property Office of People's Republic of China, which is incorporated herein by reference in its entirety.

FIELD OF THE INVENTION

The disclosure relates to the field of liquid crystal display technologies, and in particular to a touch panel and a method for driving the touch panel, and a touch display device including the touch panel.

BACKGROUND OF THE INVENTION

A touch panel includes a substrate and a touch electrode layer located on the substrate, where the touch electrode layer includes multiple touch electrodes insulated from each other and each of the multiple touch electrodes is connected to a respective touch electrode line. When the touch panel is driven, a drive signal is applied to the touch electrode via the touch electrode line connected to the touch electrode.

In the existing method for driving the touch panel, all touch electrodes in the touch panel are driven simultaneously, so that all touch electrodes transmit drive signals via touch electrodes lines connected to the touch electrode at the same time.

In this case, when the touch panel is touched, the touch electrode at the touched position of the touch panel has a changed capacitance. Due to the electrical connection between the touch electrode and the touch electrode line, in a case that the touch electrode at the touched position of the touch panel has a changed capacitance, the touch electrode line connected to the touch electrode at the touched position of the touch panel has a changed capacitance.

A touch electrode line connected to a driven touch electrode passes by other touch electrodes, and the other touch electrodes are also driven, in this way a parasitic capacitance is generated between the touch electrode line and the other touch electrodes, which causes touch crosstalk and decreases a signal to noise ratio of the touch panel.

BRIEF SUMMARY OF THE INVENTION

In view of this, a touch panel, a method for driving the touch panel and a touch display device including the touch panel are provided according to embodiments of the disclosure, to reduce touch crosstalk in the touch panel and increase the signal to noise ratio of the touch panel.

To address above technical problems, the technical solutions of the embodiments of the disclosure are as follows:

A touch panel is provided, which includes a substrate, and multiple touch electrodes and multiple touch electrode lines disposed on the substrate, where each touch electrode is connected to a respective touch electrode line;

the touch electrodes include at least a first touch electrode and a second touch electrode, and the touch electrode lines include at least a first touch electrode line and a second touch electrode line; and the first touch electrode is connected to a first end of the first touch electrode line, the second touch electrode is connected to a first end of the second touch electrode line, and the first touch electrode line is disposed at a position where the first touch electrode line does not overlap with a projection region of other touch electrode driven simultaneously with the first touch electrode in a direction perpendicular to the touch panel.

A method for driving the touch panel is provided, where the first touch electrode and the second touch electrode are driven in a time-division manner.

Another method for driving the touch panel is provided, where the first touch electrode is driven by a drive signal with a first frequency, the second touch electrode is driven by a drive signal with a second frequency, and the first touch electrode and the second touch electrode are driven simultaneously.

A touch display device is provided, which includes the touch panel.

The disclosure has the following advantages compared with the conventional technology.

In the touch panel according to embodiments of the disclosure, the first touch electrode line is configured to transmit a touch detection signal to the first touch electrode, and the first touch electrode line is disposed at a position where the first touch electrode line does not overlap with a projection region of other touch electrode driven simultaneously with the first touch electrode in a direction perpendicular to the touch panel. That is, there is no overlapping area for the first touch electrode and the touch electrode driven simultaneously with the first electrode. In this way in a case that the first touch electrode is driven, no parasitic capacitance is generated between the first touch electrode line and the touch electrode driven simultaneously with the first touch electrode. In this way, compared with the conventional solution in which driving each touch electrode results in generation of parasitic capacitance, in driving the touch panel according to the disclosure, less parasitic capacitance is generated, touch crosstalk is improved and the signal to noise ratio is increased.

BRIEF DESCRIPTION OF THE DRAWINGS

To better understand the technical solutions according to the disclosure, the following briefly describe the drawings according to the embodiments of the disclosure. Apparently, the drawings are only some embodiments of the present disclosure, and those skilled in the art may obtain other drawings without creative efforts.

DETAILED DESCRIPTION OF THE INVENTION

To understand the object, the solutions and the technical effects of the disclosure more clearly, the embodiments of the disclosure will be described below in conjunction with the drawings.

Figure 1:
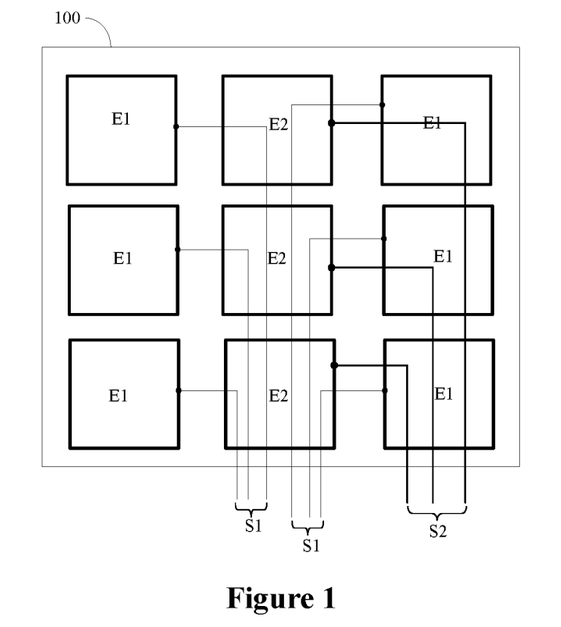
FIG. 1 is a schematic plane structural diagram of a touch panel according to embodiments of the disclosure.

FIG. 1 is a schematic structural diagram of a touch panel according to a first embodiment of the disclosure. As shown in FIG. 1, the touch panel includes a substrate 100 and multiple touch electrodes and multiple touch electrode lines located on the substrate 100, where each touch electrode is electrically connected to a respective touch electrode line.

In the touch panel according to the disclosure, the touch electrodes include first touch electrodes E1 and second touch electrodes E2. The touch electrode lines include first touch electrode lines S1 and second touch electrode lines S2. Each first touch electrode line S1 and each second touch line S2 both include a first end and a second end.

The first ends of the first touch electrode lines S1 are electrically connected to respective first touch electrodes E1, and the second ends of the first touch electrodes S1 are connected to a signal source for touch detection which may be a drive chip outside the touch panel.

The first ends of the second touch electrode line S2 are electrically connected to respective second touch electrodes E2, and the second ends of the second touch electrode lines S2 are connected to the signal source for touch detection which may be a drive chip outside the touch panel.

For avoiding touch crosstalk, the first touch electrode lines S1 are arranged in projection regions of the second touch electrodes E2 in the direction perpendicular to the touch panel, and the second touch electrode lines S2 are arranged in projection regions of the first touch electrodes E1 in the direction perpendicular to the touch panel. It should be noted that the first touch electrode lines S1 are electrically insulated from the second touch electrodes E2, and the second touch electrode lines S2 are electrically insulated from the first touch electrodes E1.

It should be noted that the touch electrode lines and the touch electrodes may be located in a same conductive layer or in different conductive layers, and the touch electrode lines may be located in a layer upper or lower than the layer where the touch electrodes are located. The position relationship between the layer where the touch electrode lines are located and the layer where the touch electrode are located is not defined according to the disclosure.

In a case that the touch panel according to the disclosure is driven, the first touch electrodes E1 and the second touch electrodes E2 are driven in a time-division manner. Specially, the second touch electrodes E2 are not driven while the first touch electrodes E1 are driven, and the first touch electrode E1 are not driven while the second touch electrode E2 are driven.

In a case that the first touch electrodes E1 are driven, the first touch electrode lines S1 transmit electrical signals, and the second touch electrodes E2 are not driven, in this way no electrical signal is applied to the second touch electrodes E2. In this way, if the touch panel is touched at this moment, no parasitic capacitance is generated between the first touch electrode lines S1 and the second touch electrodes E2 overlapping therewith. In addition, since the first touch electrodes E1 do not overlap with the first touch electrode lines S1, no parasitic capacitance is generated between the first touch electrodes E1 and the first touch electrode lines S1.

Similarly, when the second touch electrodes E2 are driven, the second touch electrode lines S2 transmit electrical signals, and the first touch electrodes E1 are not driven. In this way, no electrical signal is applied to the first touch electrodes E1. In this way if the touch panel is touched at this moment, no parasitic capacitance is generated between the second touch electrode lines S2 and the first touch electrodes E1 overlapping therewith. In addition, since the second touch electrode E2 does not overlap with the second touch electrode lines S2, no parasitic capacitance is generated between the second touch electrodes E2 and the second touch electrode lines S2.

In this way, in driving the touch panel according to the disclosure, capacitance between the touch electrode lines and the touch electrodes and signal crosstalk between the touch electrodes are reduced, and the signal to noise ratio is increased.

In the touch panel according to the first embodiment, the case that the touch electrodes include two kinds of touch electrodes, i.e., the first touch electrodes and the second touch electrodes, is taken as an example for illustration. In practice, as an extension of the embodiment of the disclosure, the touch panel may further include more kinds of touch electrodes and more kinds of touch electrode lines connected thereto, for example, a third touch electrode, a fourth touch electrode, . . . , an a-th touch electrode . . . and touch electrode lines corresponding thereto.

It should be noted that in a case that the touch electrodes include multiple kinds of touch electrodes, the multiple kinds of touch electrodes are also driven in a time-division manner.

In addition, in the touch panel according to the first embodiment, the first touch electrode lines S1 are arranged in the projection areas of the second touch electrodes E2 in the direction perpendicular to the touch panel, and the second touch electrode lines S2 are arranged in the projection areas of the first touch electrodes E1 in the direction perpendicular to the touch panel. However, as an extension of the embodiment of the disclosure, the first touch electrode lines S1 and the second touch electrode lines S2 are not limited to the arrangement according to the first embodiment, as long as the first touch electrode lines S1 do not overlap with the projection regions of other touch electrodes driven simultaneously with the first touch electrodes in the direction perpendicular to the touch panel, and the second touch electrode lines S2 do not overlap with the projection regions of other touch electrodes driven simultaneously with the second touch electrodes in the direction perpendicular to the touch panel. For example, in a case that the touch panel includes third touch electrodes, the first touch electrode lines S1 and/or the second touch electrode lines S2 may be arranged in the projection areas of the third touch electrodes in the direction perpendicular to the touch panel. In addition, the touch electrode lines may be alternatively arranged in the projection areas of the gaps between the touch electrodes in the direction perpendicular to the touch panel.

In an embodiment of the disclosure, as shown in FIG. 1, the first touch electrodes and the second touch electrodes are alternately arranged to reduce the lengths of the touch electrode lines and the resistances of the touch electrode lines as much as possible.

It should be noted that the touch electrodes may be reused in the touch display panel according to the embodiment of the disclosure. In this way, for the touch display panel in which the touch electrodes are reused, a touch electrode layer according to the embodiment of the disclosure is a common electrode layer of the touch display panel, in which the touch electrodes may double as common electrodes.

As is known in the art, wirings of the touch electrode lines in the touch panel are performed in a same direction as far as possible for reducing parasitic capacitance caused by signal wiring to the greatest extent, to acquire minimum parasitic capacitance. In this way the touch electrodes may be grouped, and wirings of touch electrodes in a group may be arranged in the projection regions of touch electrodes in another group in the direction perpendicular to the touch panel, which is described in detail in a second embodiment.

It should be noted that all touch electrodes are arranged in an array on a substrate, that is, all touch electrodes form a touch electrode array on the substrate. The touch electrode array is arranged to be an N×M array. In the N×M array, there are a first column, a second column . . . to an N-th column of touch electrodes from left to right, and there are a first row, a second row . . . to an M-th row of touch electrodes from top to bottom, where N and M are both integers equal to or greater than 2.

Figure 2:
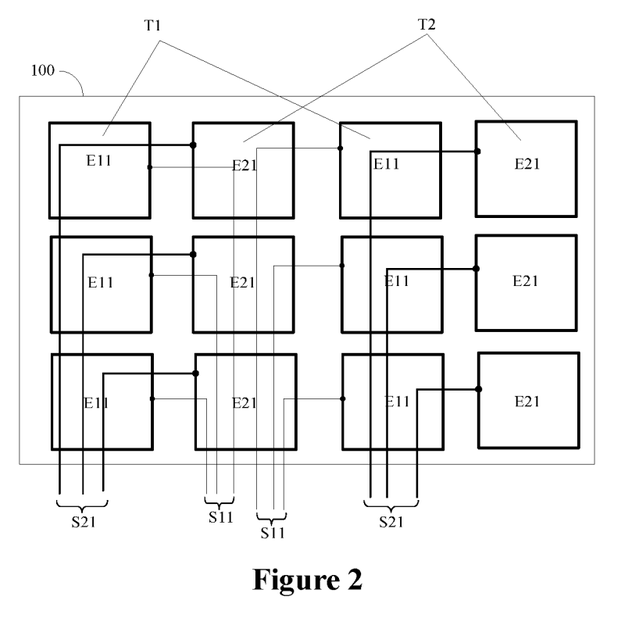
FIG. 2 is a schematic plane structural diagram of a touch panel according to embodiments of the disclosure.

FIG. 2 is a schematic structural diagram of a touch panel according to the second embodiment of the disclosure. The touch electrode array shown in FIG. 2 is a 4×3 array. The wirings of touch electrode lines connected to touch electrodes are performed along the column direction of the touch electrode array.

As shown in FIG. 2, the touch electrode array includes a first group T1 of touch electrodes including multiple first touch electrodes E11 and a second group T2 of touch electrodes including multiple second touch electrodes E21. The multiple first touch electrodes E11 in the first group T1 of touch electrodes are arranged along the column direction, and the multiple second touch electrodes E21 in the second group T2 of touch electrodes are also arranged along the column direction. As shown in FIG. 2, the first group T1 of touch electrodes includes two columns of touch electrodes, i.e., a first column of touch electrodes and a third column of touch electrodes, and the second group T2 of touch electrodes includes two columns of touch electrodes, i.e., a second column of touch electrodes and a fourth column of touch electrodes.

A first group S11 of touch electrode lines connected to the first touch electrodes E11 in the first group T1 of touch electrodes is arranged in the projection areas of touch electrodes in the second group T2 in the direction perpendicular to the touch panel, and a second group S21 of touch electrode lines connected to the second touch electrodes E21 in the second group T2 of touch electrodes is arranged in the projection areas of touch electrodes in the first group T1 in the direction perpendicular to the touch panel.

Similar to the time-division way for driving the first touch electrode E11 and the second touch electrode E21 according to the first embodiment, the touch electrodes in the first group T1 and the touch electrodes in the second group T2 may also be driven in a time-division manner, in driving the touch panel according to the second embodiment.

In a case that the touch electrodes in the first group T1 are driven, the touch electrodes in the second group T2 are not driven. Since touch electrode lines in the first group S11 are arranged in the projection areas of the touch electrodes in the second group T2 in the direction perpendicular to the touch panel, touch electrode lines in the first group S11 do not overlap with the touch electrodes E11 in the first group T1, in this way no parasitic capacitance is generated between touch electrode lines in the first group S11 and the touch electrodes E11 in the first group T1 of touch electrodes. Furthermore, since no electrical signal is applied to the touch electrodes E21 in the second group T2 of touch electrodes no parasitic capacitance is generated between the touch electrode lines in the first group S11 and the touch electrodes in the second group T2 of touch electrodes. Similar to the first embodiment, in driving the touch panel according to the embodiment of the disclosure, parasitic capacitance may be reduced, signal crosstalk between the touch electrodes may not be caused, and the signal to noise ratio of the touch panel is increased.

It should be noted that in the touch panel as shown in FIG. 2, the first group T1 of touch electrodes includes two columns of touch electrodes. In practice, in an embodiment of the disclosure, in a case that the touch electrode array includes multiple columns of touch electrodes, the number of the columns of touch electrodes in the first group T1 of touch electrodes is not limited, and specially, the number of the columns of touch electrodes in the first group T1 of touch electrodes may be 1, 2, 3, 5, 10, . . . . In general, the first group of touch electrodes T1 includes an integer number of columns of touch electrodes. Similarly, the second group of touch electrodes T2 may also include an integer number of columns of touch electrodes.

Furthermore, in a case that the first group of touch electrodes T1 includes n1 columns of touch electrodes, n1 is an integer equal to or greater than 2, and the n1 columns of touch electrodes may be arranged adjacent or nonadjacent to each other.

Similarly, in a case that the second group of touch electrodes T2 includes n1 columns of touch electrodes, n1 is an integer equal to or greater than 2, and the n1 columns of touch electrodes may be arranged adjacent or nonadjacent to each other.

In the touch panel as shown in FIG. 2, two columns of touch electrodes in a same group of touch electrodes are arranged nonadjacent to each other. In a case that two columns of touch electrodes in a same group of touch electrodes are arranged adjacent to each other, touch electrode lines connected to the touch electrodes in the two columns are arranged as shown in FIG. 3.

Figure 3:
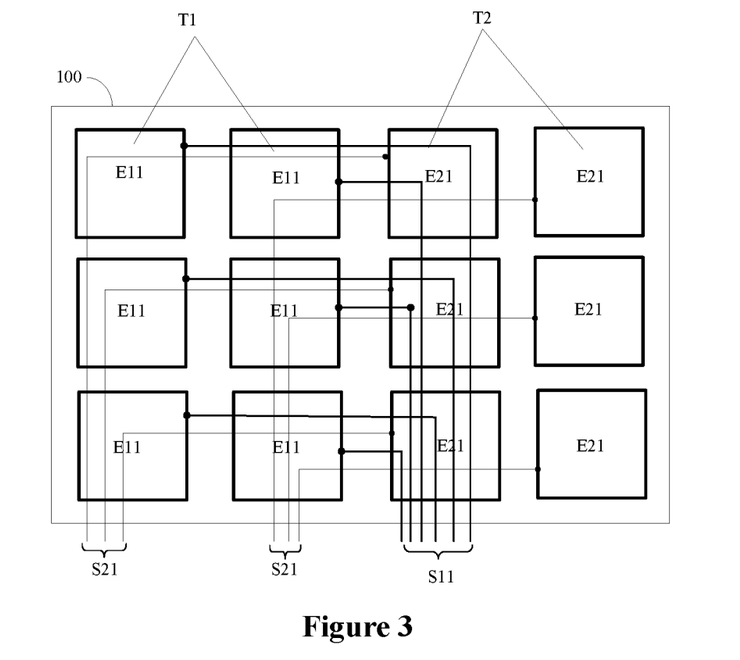
FIG. 3 is a schematic plane structural diagram of another touch panel according to embodiments of the disclosure.

In the touch panel as shown in FIG. 3, a first column of touch electrodes and a second column of touch electrodes both belong to the first group of touch electrodes, and a third column of touch electrodes and a fourth column of touch electrodes both belong to the second group of touch electrodes. As shown in FIG. 3, each touch electrode line connected to the touch electrode in the first column passes by the touch electrode in the second column and is arranged in the projection areas of the touch electrodes in the third column in the direction perpendicular to the touch panel, and each touch electrode line connected to the touch electrode in the second column is also arranged in the projection areas of the touch electrodes in the third column in the direction perpendicular to the touch panel.

Each touch electrode line connected to the touch electrode in the third column passes by the touch electrode in the second column and is arranged in the projection areas of the touch electrodes in the first column in the direction perpendicular to the touch panel, and each touch electrode line connected to the touch electrode in the fourth column passes by the touch electrode in the third column and is arranged in the projection areas of the touch electrodes in the second column in the direction perpendicular to the touch panel.

Furthermore, according to an embodiment of the disclosure, each column of the touch electrodes in the first group T1 and each column of the touch electrodes in the second group T2 are alternately arranged, to reduce the overlapping area between the touch electrode lines and the touch electrodes.

According to a more specific embodiment of the disclosure, the first group T1 of touch electrodes may include all odd-numbered columns of touch electrodes in the touch electrode array, and the second group T2 of touch electrodes may include all even-numbered columns of touch electrodes in the touch electrode array. The touch electrode lines corresponding to touch electrodes in each column of the first group of touch electrodes are arranged in the projection areas of touch electrodes in adjacent even-numbered column (s) in the direction perpendicular to the touch panel. The adjacent even-numbered column(s) include a preceding column and a next column for the column in the first group. For example, the touch electrode lines corresponding to the touch electrodes in the first column are arranged in the projection areas of the touch electrodes in the second column in the direction perpendicular to the touch panel, the touch electrode lines corresponding to the touch electrodes in the third column are arranged in the projection areas of the touch electrodes in the fourth column in the direction perpendicular to the touch panel, and furthermore, the touch electrode lines corresponding to the touch electrodes in the third column may alternatively be arranged in the projection areas of the touch electrodes in the second column in the direction perpendicular to the touch panel. In addition, one part of the touch electrode lines connected to the touch electrodes in the third column may be arranged in the projection areas of the touch electrodes in the second column in the direction perpendicular to the touch panel, and the other part of the touch electrode lines may be arranged in the projection areas of the touch electrodes in the fourth column in the direction perpendicular to the touch panel.

Similarly, the touch electrode lines corresponding to touch electrodes in each column of the second group of touch electrodes may be arranged in the projection areas of touch electrodes in adjacent odd-numbered column(s) in the direction perpendicular to the touch panel. For example, the touch electrode lines corresponding to the touch electrodes in the second column are arranged in the projection areas of touch electrodes in the third column and/or the first column in the direction perpendicular to the touch panel.

In general, the touch electrode array is arranged with N columns, where N is a positive integer. The arrangement of the touch electrode lines corresponding to the touch electrodes in the second column to the N-th column may be expressed as follows.

The touch electrode lines connected to touch electrodes in the i-th column are arranged in the projection areas of the touch electrodes in (i−1)-th column and/or (i+1)-th column in the direction perpendicular to the touch panel, where 2≤i≤N, and i is an integer.

It should be noted that in the second embodiment, the case that wirings of the touch electrode lines are performed along the column direction of the touch electrode array is taken as an example for illustration. In practice, in an embodiment of the disclosure, the wirings of the touch electrode lines may alternatively be performed along the row direction of the touch electrode array. In a third embodiment, a touch panel, in which the wirings of the touch electrode lines is performed along the row direction of the touch electrode array, is provided.

Figure 4:
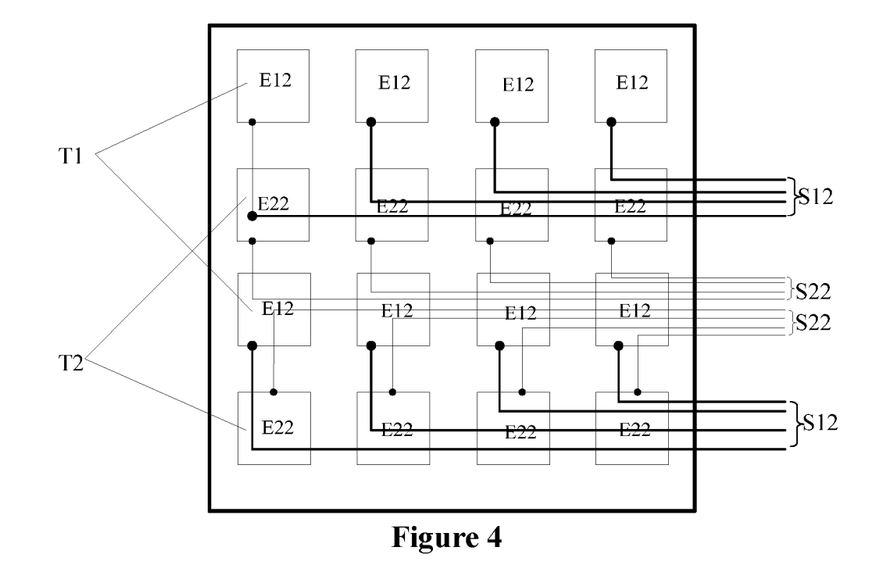
FIG. 4 is a schematic plane structural diagram of a touch panel according to embodiments of the disclosure.

FIG. 4 is a schematic structural diagram of a touch panel according to the third embodiment of the disclosure.

In the touch panel according to the embodiment of the disclosure, all touch electrodes are arranged in an array on a substrate. The touch electrode array shown in FIG. 4 is a 4×4 array.

As shown in FIG. 4, the touch electrode array includes a first group T1 of touch electrodes including first touch electrodes and a second group T2 of touch electrodes including second touch electrodes.

The first group T1 of touch electrodes includes a first row of touch electrodes and a third row of touch electrodes, and the second group T2 of touch electrodes includes a second row of touch electrodes and a fourth row of touch electrodes.

The touch electrode lines connected to the touch electrodes in the first row are arranged in the projection areas of the touch electrodes in the second row in the direction perpendicular to the touch panel, the touch electrode lines connected to the touch electrodes in the second row are arranged in the projection areas of the touch electrodes in the third row in the direction perpendicular to the touch panel, the touch electrode lines connected to the touch electrodes in the third row are arranged in the projection areas of the touch electrodes in the fourth row in the direction perpendicular to the touch panel, and the touch electrodes lines connected to the touch electrodes in the fourth row are arranged in the projection areas of the touch electrodes in the third row in the direction perpendicular to the touch panel.

In the embodiment of disclosure, the touch electrodes in the first group T1 and the touch electrodes in the second T2 are driven in a time-division manner.

In this way, based on the same principle as the second embodiment, no parasitic capacitance is generated between the touch electrode lines in the first group S12 and the touch electrodes in the second group T2 of touch electrodes, and no parasitic capacitance is generated between touch electrode lines in the second group S22 and the touch electrodes in the first group T1 of touch electrodes.

In this way, in driving the touch panel according to the third embodiment of the disclosure, less parasitic capacitance is generated, signal crosstalk between the touch electrodes is reduced, and the signal to noise ratio is increased.

It should be noted that the first group T1 of touch electrodes includes two rows of touch electrodes in the touch panel shown in FIG. 4. In practice, according to an embodiment of the disclosure, in a case that the touch electrode array includes multiple rows of touch electrodes, the number of rows of the touch electrodes in the first group T1 of touch electrodes is not limited. Specially, the number of rows of the touch electrodes in the first group T1 of touch electrodes may be 1, 2, 3, 5, 10 . . . . In general, the first group T1 of touch electrodes may include an integer number of rows of touch electrodes. Similarly, the second group T2 of touch electrodes may also include an integer number of rows of touch electrodes.

Furthermore, in a case that the first group T1 of touch electrodes includes n1 rows of touch electrodes, n1 is an integer equal to or greater than 2, and the n1 rows of touch electrodes may be arranged adjacent or nonadjacent to each other.

Similarly, in a case that the second group T2 of touch electrodes includes n2 rows of touch electrodes, n2 is an integer equal to or greater than 2, and the n2 rows of touch electrodes may be arranged adjacent or nonadjacent to each other.

Furthermore, according to an embodiment of the disclosure, each row of touch electrodes in the first group T1 and each row of touch electrodes in the second group T2 are alternately arranged, to reduce overlapping area between the touch electrode lines and the touch electrodes.

According to a more specific embodiment of the disclosure, the first group T1 of touch electrodes may include all odd-numbered rows of touch electrodes in the touch electrode array, and the second group T2 of touch electrodes may include all even-numbered rows of touch electrodes in the touch electrode array. The touch electrode lines corresponding to touch electrodes in each row of the first group of touch electrodes are arranged in the projection areas of touch electrodes in adjacent even-numbered row(s) in the direction perpendicular to the touch panel. The adjacent even-numbered row(s) include a preceding row and a next row for the row in the first group. For example, the touch electrode lines corresponding to the touch electrodes in the first row are arranged in the projection areas of the touch electrodes in the second row in the direction perpendicular to the touch panel, the touch electrode lines corresponding to the touch electrodes in the third row are arranged in the projection areas of the touch electrodes in the fourth row in the direction perpendicular to the touch panel, and furthermore, the touch electrode lines corresponding to the touch electrodes in the third row may alternatively be arranged in the projection areas of the touch electrodes in the second row in the direction perpendicular to the touch panel. In addition, one part of the touch electrode lines connected to the touch electrodes in the third row may be arranged in the projection areas of the touch electrodes in the second row in the direction perpendicular to the touch panel, and the other part of the touch electrode lines may be arranged in the projection areas of the touch electrodes in the fourth row in the direction perpendicular to the touch panel.

Similarly, the touch electrode lines corresponding to touch electrodes in each row of the second group of touch electrodes may be arranged in the projection areas of touch electrodes in adjacent odd-numbered row(s) in the direction perpendicular to the touch panel. For example, the touch electrode lines corresponding to the touch electrodes in the second row are arranged in the projection areas of touch electrodes in the third row and/or the first row in the direction perpendicular to the touch panel.

In general, the touch electrode lines corresponding to the touch electrodes in the first row are arranged in the projection areas of the touch electrodes in the second row in the direction perpendicular to the touch panel. The touch electrode lines connected to touch electrodes in the j-th row are arranged in the projection areas of the touch electrodes in (j−1)-th row and/or (j+1)-th row in the direction perpendicular to the touch panel, where $2 \leq j \leq N$, and j is an integer.

In a fourth embodiment of the disclosure, the wirings of the touch electrode lines may alternatively be performed along the diagonal direction of the touch electrode array.

Figure 5:
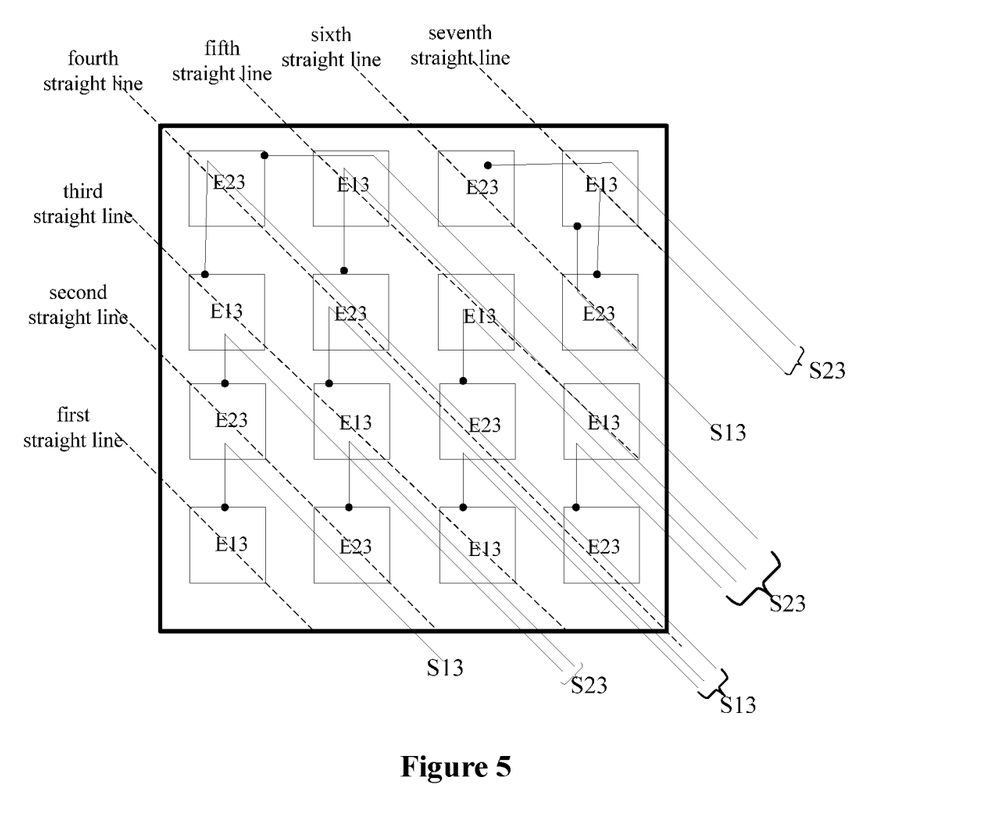
FIG. 5 is a schematic plane structural diagram of a touch panel according to embodiments of the disclosure.

FIG. 5 shows a schematic structural diagram of a touch panel in which the wirings of the touch electrode lines are performed along the diagonal direction of the touch electrode array according to the fourth embodiment.

The touch electrode array shown in FIG. 5 is a 4×4 array. In the touch electrode array shown in FIG. 5, the wirings of the touch electrode lines are performed along the diagonal direction (hereinafter referred to as a first diagonal direction) from the top-left corner to the bottom-right corner of the touch electrode array.

Straight lines, which pass through touch electrodes in the first row and touch electrodes in the first column respectively and are parallel to the first diagonal direction, are drawn, and the straight lines, from the bottom-left corner to the top-right corner of the touch electrode array, are respectively a first straight line, a second straight line, to a seventh straight line. The touch electrodes on odd-numbered straight lines are the first touch electrodes, and the touch electrodes on even-numbered straight lines are the second touch electrodes.

Similar to the above embodiments, the touch electrode lines S13 connected to the first touch electrodes are arranged in projection areas of the second touch electrodes on an adjacent straight line in the direction perpendicular to the touch panel, and the touch electrode lines S23 connected to the second touch electrodes are arranged in projection areas of the first touch electrodes on an adjacent straight line in the direction perpendicular to the touch panel. The first touch electrodes and the second touch electrodes are driven in a time-division manner. In this way, with the touch panel according to the embodiment of the disclosure, the technical effects achieved by the foregoing embodiments may also be achieved, a reasoning process of which is the same as that of the foregoing embodiments, and is not described herein.

It should be noted that in the touch panel in which the wirings of the touch electrode lines are performed along the diagonal direction of the touch electrode array, the arrangement of the first touch electrodes and the second touch electrodes is not limited to the arrangement shown in FIG. 5. In practice, the first touch electrodes and the second touch electrodes may be arranged in many other ways, as those for the case that the wirings of the touch electrode lines are performed along the column direction or the row direction. For example, the first touch electrodes and the second touch electrodes may be arranged on multiple adjacent straight lines respectively.

In addition, in the touch panel according to the embodiment of the disclosure, the touch electrode array may be an N×M touch array. In this case, there are (N+M−1) straight lines parallel to the first diagonal line. The (N+M−1) straight lines are sequentially defined according to a specified order to be a first straight line, a second straight line, . . . , to a (N+M−1)-th straight line.

For the (N+M−1) straight lines, the touch electrodes on odd-numbered straight lines may be defined to be the first touch electrodes, and the touch electrodes on even-numbered straight lines may be defined to be the second touch electrodes. In addition, as an extension of the embodiment of the disclosure, the first touch electrodes may include touch electrodes on n1 straight lines, and the second touch electrodes may include touch electrodes on n2 straight lines. The n1 straight lines may be adjacent or nonadjacent. Similarly, the n2 straight lines may be adjacent or nonadjacent.

In the touch panels according to the first embodiment to the fourth embodiment, less parasitic capacitance is generated, and crosstalk between touch electrodes is eliminated only in a case that the first touch electrodes and the second touch electrodes are driven in a time-division manner. To avoid generation of crosstalk between the touch electrodes in a case that all touch electrodes in the touch panel are simultaneously driven, a fifth embodiment is provided according to the disclosure.

It should be noted that the touch panel according to the fifth embodiment is acquired by making an improvement on the touch panel according to any one of the first embodiment to the fourth embodiment. Briefly, as shown in FIG. 6, first bandwidth filters and second bandwidth filters are added in the touch panel according to the fifth embodiment as compared with the touch panels according to the first embodiment to the fourth embodiment.

Figure 6:
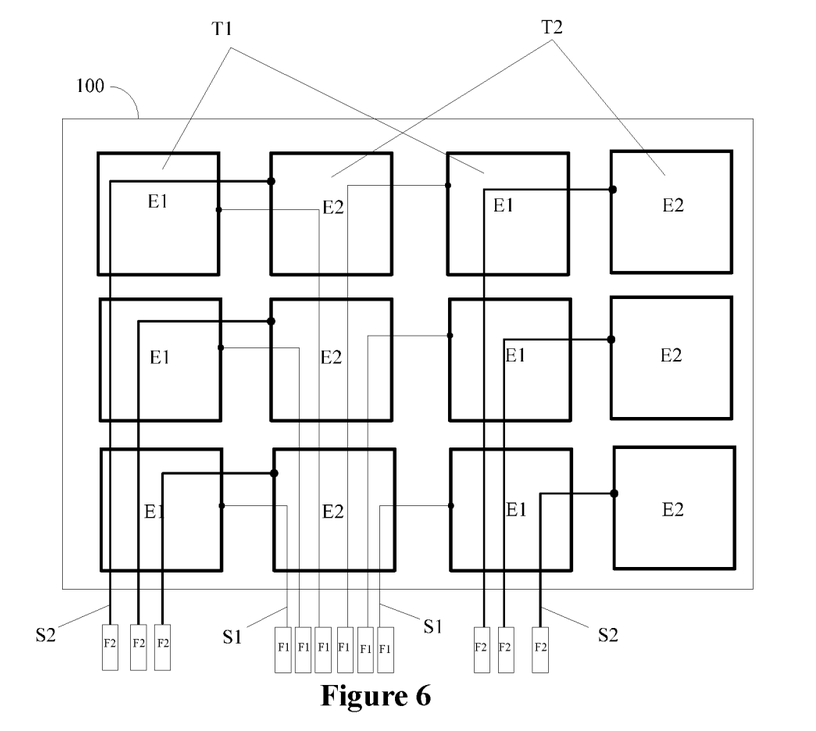
FIG. 6 is a schematic plane structural diagram of a touch panel according to embodiments of the disclosure.

FIG. 6 is a schematic structural diagram of the touch panel according to the fifth embodiment of the disclosure. The touch panel shown in FIG. 6 is acquired by making an improvement on the touch panel according to the second embodiment. As compared with the touch panel shown in FIG. 2 according to the second embodiment, the touch panel according to the fifth embodiment may further include:

multiple first bandwidth filters F1 and second bandwidth filters F2, where an output terminal of each first bandwidth filter F1 is connected to a second end of each first touch electrode line S1 connected to a respective first touch electrode in the first group of touch electrodes, and an output terminal of each second bandwidth filter F2 connected to a second end of each second touch electrode line S2 connected to a respective second touch electrode in the second group of touch electrodes.

Signals output by the first bandwidth filters F1 are configured to drive all first touch electrodes in the first group of touch electrodes, and signals output by the second bandwidth filters F2 are configured to drive all second touch electrodes in the second group of touch electrodes.

It should be noted that the frequency of the signals for driving the first touch electrodes in the first group of touch electrodes is different from the frequency of the signal for driving the second touch electrodes in the second group of touch electrodes. In this way, frequency f1 of first signals output by the first bandwidth filters F1 is different from frequency f2 of second signals output by the second bandwidth filters F2. The first signal frequency f1 differs from the second signal frequency f2 by at least 2%, which is formulated as $$\left|\frac{f1-f2}{f1}\right| \geq 2\%,$$

or more differently, the first signal frequency f1 differs from the second signal frequency f2 by at least 10%, which is formulated as $$\left|\frac{f1-f2}{f1}\right| \geq 10\%.$$

The input terminals of the first bandwidth filters F1 and the second bandwidth filters F2 are connected to a touch signal source which may be a drive chip (not shown in FIG. 5) outside the touch panel. Touch detection signals or other electrical signals are provided by the drive chip.

Since the first signal frequency of the signal for driving the first touch electrodes differs from the second signal frequency of the signal for driving the second touch electrodes, by at least 2%, in a case that the first touch electrodes and the second touch electrodes are simultaneously driven, the electrical signals on the first touch electrode lines do not interfere with the electrical signals on the second touch electrodes, and the electrical signals on the second touch electrode lines do not interfere with the electrical signals on the first touch electrodes. In this way, in the touch panel according to the fifth embodiment of the disclosure, no signal crosstalk is generated between the touch electrodes in a case that all touch electrodes in the touch panel are simultaneously driven. In this case, the touch panel according to the embodiment of disclosure has a high signal to noise ratio.

In addition, as another variation of the embodiment of the disclosure, the first touch electrodes and the second touch electrodes may alternatively be driven in a time-division manner.

A touch display device is further provided based on the touch panel according to any one of the first embodiment to the fifth embodiment, which is described in detail in a sixth embodiment.

Figure 7:
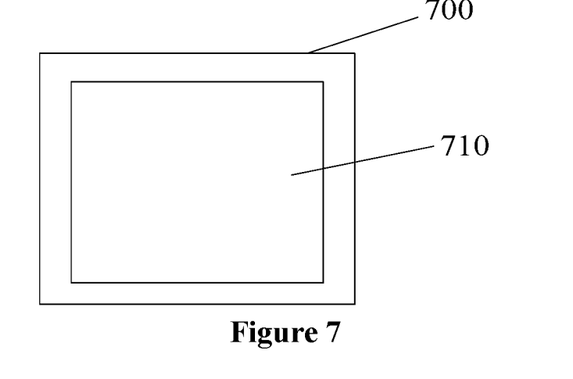
FIG. 7 is a schematic plane structural diagram of a touch display device according to embodiments of the disclosure.

FIG. 7 is a schematic structural diagram of a touch display device according to the sixth embodiment. The touch display device 700 includes: a touch display panel 710 including the touch panel according to any one of the first embodiment to the fifth embodiment.

Figure 8:
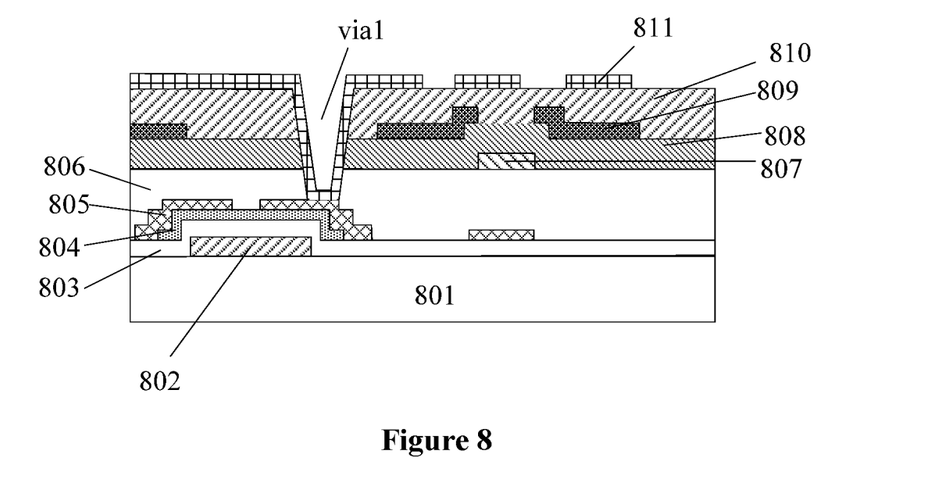
FIG. 8 is a schematic sectional structural diagram of the touch panel according to embodiments of the disclosure.

FIG. 8 is a schematic sectional view of the touch display panel 710. The touch display panel includes:

a substrate 801;

a gate layer 802 located on the substrate 801, where the gate layer 802 is provided with multiple gate lines;

a gate insulation layer 803 wrapping the gate layer 802;

a semiconductor layer 804 located on the gate insulation layer 803, where the semiconductor layer 804 only covers a portion of the gate insulation layer 803 and a portion of the semiconductor layer 804 is located above the gate layer 802;

a data line layer 805 located on the gate insulation layer 803 and the semiconductor layer 804, where first electrodes, second electrodes of thin-film transistors and data lines are arranged in the data line layer 805;

a third insulation layer 806 located above the data line layer 805, where the third insulation layer 806 is typically an organic insulation layer;

a touch electrode line 807 located on the third insulation layer 806, where the touch electrode line 807 is typically a metallic wiring;

a first insulation layer 808 wrapping the touch electrode line 807;

a common electrode layer 809 located on the first insulation layer 808;

a second insulation layer 810 wrapping the common electrode layer 809; and a pixel electrode layer 811 located above the second insulation layer 810.

In the embodiment of the disclosure, a via vial is arranged in the first insulation layer 808 and the second insulation layer 810, and the pixel electrode layer 811 is electrically connected to the first electrode arranged on the data line layer 805 by means of the via vial. In addition, according to another embodiment of the disclosure, the pixel electrode layer 811 may alternatively overlap with the first electrode, and achieve electrical connection with the first electrode by bonding.

It should be noted that the common electrodes may be reused in the touch display panel. In the touch display panel according to the disclosure, multiple common electrode blocks insulated from each other are arranged in the common electrode layer 809, and each common electrode block doubles as the touch electrode and the common electrode. The touch electrode line 807 is configured to input a common voltage signal to the common electrode block in the common electrode layer 809 in a display period, and is configured to input a touch drive signal to the common electrode block in the common electrode layer 809 in a touch detection period.

According to another embodiment of the disclosure, the gate lines may also be reused. The gate lines are configured to provide touch drive signals to the touch electrodes in a case that the touch display device operates in the touch detection period.

According to still another embodiment of the disclosure, the data lines may also be reused. The data lines are configured to provide touch drive signals to the touch electrodes in a case that the touch display device operates in the touch detection period.

It should be noted that the thin-film transistor shown in FIG. 8 has a bottom-gate structure. In practice, the thin-film transistor according to the embodiment of the disclosure may alternatively have a top-gate structure. In addition, the positions of the pixel electrode and the common electrode may be interchanged, which are not described in detail herein.

The above description of the disclosed embodiments enables those skilled in the art to implement or use the present disclosure. Various modifications to these embodiments are obvious to those skilled in the art, and the general principle according to the disclosure may be implemented in other embodiments without deviation from the spirit or scope of the present disclosure. In this way, the present disclosure is not limited to the disclosed embodiments, but conforms to the widest scope consistent with the principle and novel features disclosed herein.

What is claimed is:

1. A touch panel, comprising:
    a substrate;
    a plurality of touch electrodes disposed on the substrate;
    a plurality of touch electrode lines each connected respectively to one of the plurality of touch electrodes disposed on the substrate; and
    a first bandwidth filter and a second bandwidth filter;
    wherein the plurality of touch electrodes comprises at least a first touch electrode and a second touch electrode, and wherein the plurality of touch electrode lines comprises at least a first touch electrode line and a second touch electrode line,
    wherein the first touch electrode is connected to a first end of the first touch electrode line, the second touch electrode is connected to a first end of the second touch electrode line, and the first touch electrode line is disposed at a first position where the first touch electrode line does not overlap with a first projection region of other touch electrodes driven simultaneously with the first touch electrode in a direction perpendicular to the touch panel,
    wherein an output terminal of the first bandwidth filter is connected to a second end of the first touch electrode line, and an output terminal of the second bandwidth filter is connected to a second end of the second touch electrode line, and
    wherein a frequency f1 of a first signal outputted by the first bandwidth filter is different from a frequency f2 of a second signal outputted by the second bandwidth filter, and f1 and f2 satisfy the following equation:

$$\left|\frac{f1-f2}{f1}\right| \geq 2\%.$$

2. The touch panel according to claim 1, wherein the second touch electrode line is disposed at a second position where the second touch electrode line does not overlap with a second projection region of other touch electrodes driven simultaneously with the second touch electrode in the direction perpendicular to the touch panel.

3. The touch panel according to claim 1, wherein the first touch electrode and the second touch electrode are alternately arranged.

4. The touch panel according to claim 1, wherein the plurality of touch electrodes form a touch electrode array on the substrate, the plurality of touch electrode lines connected to the plurality of touch electrodes forms a first direction of the touch electrode array; wherein the touch electrode array comprises at least a first group of touch electrodes and a second group of touch electrodes, wherein the first group of touch electrodes comprise a plurality of first touch electrodes located on at least one straight line in along the first direction, and the second group of touch electrodes comprise a plurality of second touch electrodes located on at least one straight line along the first direction.

5. The touch panel according to claim 4, wherein the first group of touch electrodes and the second group of touch electrodes are alternately arranged in the first direction.

6. The touch panel according to claim 5, wherein the touch electrode array comprises M rows of touch electrodes, where M is a positive integer equal to or greater than 2; the first direction is the row direction of the touch electrode array, the first group of touch electrodes comprise odd-numbered rows of touch electrodes in the touch electrode array, and the second group of touch electrodes comprise even-numbered rows of touch electrodes in the touch electrode array.

7. The touch panel according to claim 6, wherein the touch electrode lines connected to touch electrodes in a j-th row are disposed in at least one of projection areas of touch electrodes in a (j−1)-th row and a (j+1)-th row in the direction perpendicular to the touch panel, where 2≤j≤M and j is an integer.

8. The touch panel according to claim 5, wherein the touch electrode array comprises N columns of touch electrodes, wherein N is a positive integer equal to or greater than 2; the first direction is the column direction of the touch electrode array, the first group of touch electrodes comprise odd-numbered columns of touch electrodes in the touch electrode array, and the second group of touch electrodes comprise even-numbered columns of touch electrodes in the touch electrode array.

9. The touch panel according to claim 8, wherein the touch electrode lines connected to touch electrodes in an i-th column are disposed in at least one of projection areas of touch electrodes in an (i−1)-th column and an (i+1)-th column in the direction perpendicular to the touch panel, where 2≤i≤N and i is an integer.

10. The touch panel according to claim 1, wherein the first touch electrode line is disposed at the first position where the first touch electrode line overlaps with a third projection region of the second touch electrode in the direction perpendicular to the touch panel, and the second touch electrode line is disposed at a third position where the second touch electrode line overlaps with a fourth projection region of the first touch electrode in the direction perpendicular to the touch panel.

11. A method for driving a touch panel according to claim 1, wherein the first signal is applied to the first touch electrode, the second signal is applied to the second touch electrode, and the first touch electrode and the second touch electrode are simultaneously driven.

12. A touch display device comprising a touch panel, wherein the touch panel comprises:
    a substrate;
    a plurality of touch electrodes disposed on the substrate;

a plurality of touch electrode lines each is connected respectively to one of the plurality of touch electrodes disposed on the substrate; and a first bandwidth filter and a second bandwidth filter;

wherein the plurality of touch electrodes comprises at least a first touch electrode and a second touch electrode, and wherein the plurality of touch electrode lines comprises at least a first touch electrode line and a second touch electrode line;

wherein the first touch electrode is connected to a first end of the first touch electrode line, the second touch electrode is connected to a first end of the second touch electrode line, and the first touch electrode line is disposed at a first position where the first touch electrode line does not overlap with a first projection region of others of the plurality of touch electrodes driven simultaneously with the first touch electrode in a direction perpendicular to the touch panel;

wherein an output terminal of the first bandwidth filter is connected to a second end of the first touch electrode line, and an output terminal of the second bandwidth filter is connected to a second end of the second touch electrode line, and wherein a frequency f1 of a first signal outputted by the first bandwidth filter is different from a frequency f2 of a second signal outputted by the second bandwidth filter, and f1 and f2 satisfy the following equation:

$$\left| \frac{f1 - f2}{f1} \right| \geq 2\%.$$

13. The touch display device according to claim 12, wherein the touch panel comprises a common electrode layer which comprises a plurality of common electrodes insulated from each other; wherein the plurality of common electrodes is reused as the plurality of touch electrodes in a touch period, and wherein the plurality of touch electrode lines are configured to provide common potential signals for the plurality of common electrodes in a display period.

14. The touch display device according to claim 12, wherein the touch panel further comprises gate lines; wherein the gate lines is reused as the plurality of touch electrode lines, and wherein the plurality of touch electrode lines are configured to provide touch drive signals for the plurality of touch electrodes in a touch period.

15. The touch display device according to claim 12, wherein the touch panel further comprises data lines; the data lines double as the plurality of touch electrode lines, and the plurality of touch electrode lines are configured to provide touch drive signals for the plurality of touch electrodes in a touch period.

* * * * *